United States Patent
Motta et al.

(10) Patent No.: US 10,097,759 B1
(45) Date of Patent: Oct. 9, 2018

(54) 360 DEGREE IMAGE PRESENTATION

(71) Applicant: Apple Inc., Cupertino, CA (US)

(72) Inventors: Ricardo Motta, Palo Alto, CA (US);
David D. Kuo, San Jose, CA (US);
Matthaeus Krenn, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 158 days.

(21) Appl. No.: 15/282,821

(22) Filed: Sep. 30, 2016

Related U.S. Application Data

(60) Provisional application No. 62/235,537, filed on Sep. 30, 2015.

(51) Int. Cl.
*H04N 7/00* (2011.01)
*H04N 5/232* (2006.01)

(52) U.S. Cl.
CPC ..... *H04N 5/23267* (2013.01); *H04N 5/23238* (2013.01); *H04N 5/23254* (2013.01)

(58) Field of Classification Search
CPC .......... H04N 5/23267; H04N 5/23238; H04N 5/23254
USPC .......................................................... 348/37
See application file for complete search history.

(56) References Cited

U.S. PATENT DOCUMENTS 7,747,105 B2 *  6/2010  Koch .................. G06T 3/60
                                                    345/419

2012/0092348 A1    4/2012  McCutchen
2016/0005435 A1 *  1/2016  Campbell .......... H04N 9/806
                                                    386/240

FOREIGN PATENT DOCUMENTS

WO    1997001241 A1    1/1997
WO    2008114264 A2    9/2008

OTHER PUBLICATIONS

Ricoh Theta, Retrieved from the Internet: URL: https://theta360.com/en/about/theta/ [retrieved on Apr. 1, 2015].

* cited by examiner

*Primary Examiner* — Allen Wong
(74) *Attorney, Agent, or Firm* — Blank Rome LLP

(57) ABSTRACT

Techniques are disclosed for stabilizing a stream of spherical images captured by an image capture device to produce a stabilized spherical video sequence. The rotation of the image capture device during capture may be corrected in one or more desired axial directions in a way that is agnostic to the translation of the image capture device. The rotation of the image capture device may also be corrected in one or more desired axial directions in a way that is aware of the translation of the image capture device. For example, the assembled output spherical video sequence may be corrected to maintain the horizon of the scene at a constant location, regardless of the translation of the image capture device (i.e., a 'translation-agnostic' correction), while simultaneously being corrected to maintain the yaw of the scene in the direction of the image capture device's translation through three-dimensional space (i.e., a 'translation-aware' correction).

20 Claims, 12 Drawing Sheets

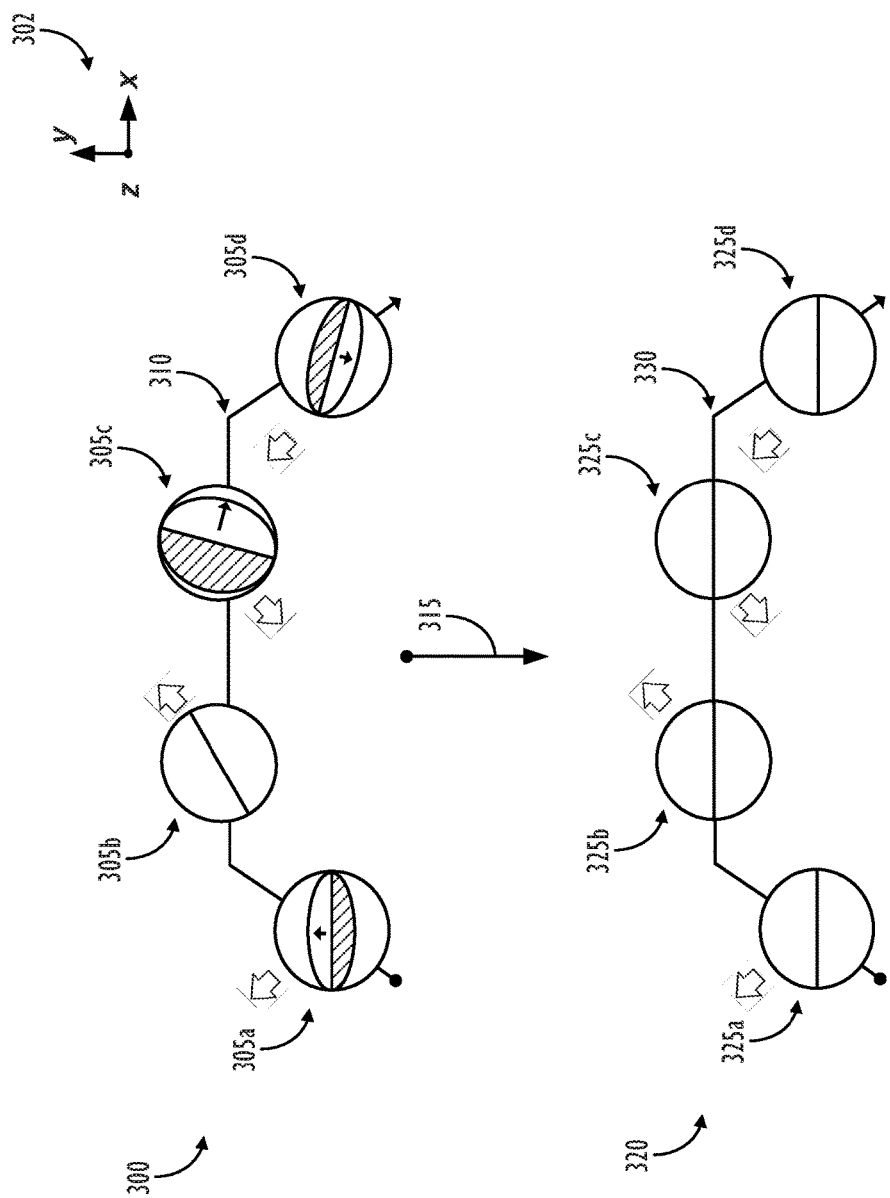

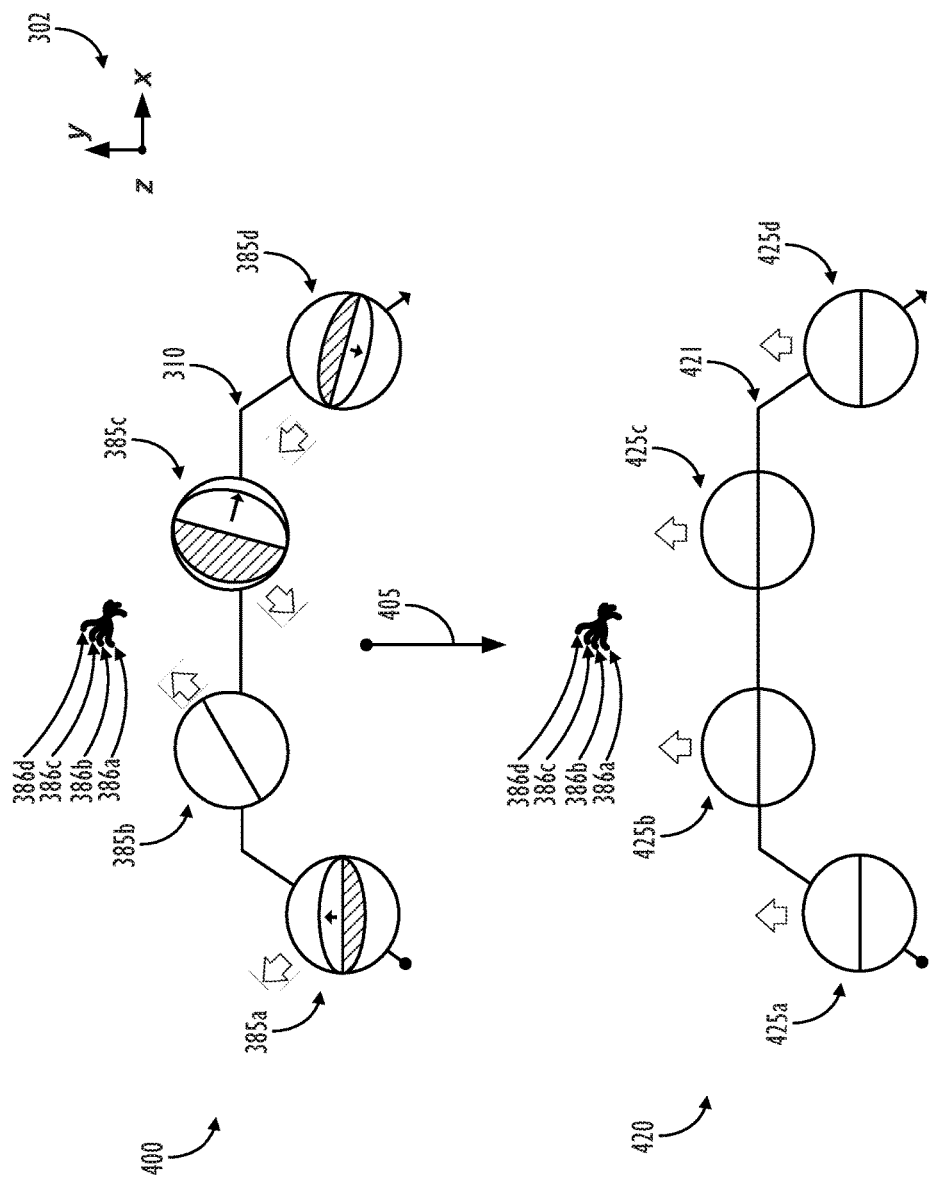

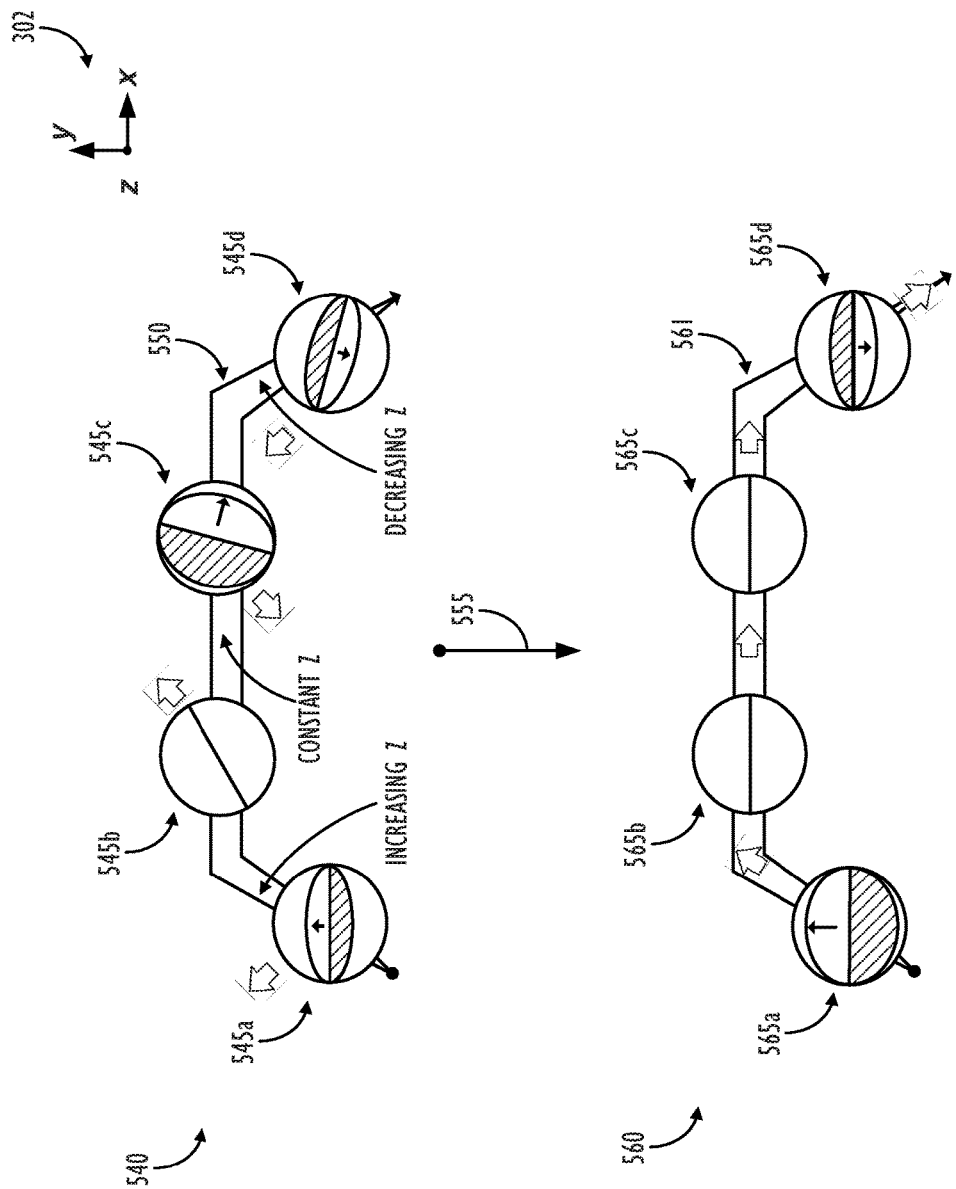

360 DEGREE IMAGE PRESENTATION

TECHNICAL FIELD

This disclosure relates generally to the field of image processing. More particularly, but not by way of limitation, it relates to techniques for stabilizing spherically-captured images, such that camera motion yields a stable representation of the captured scene, while still reflecting desired camera movement.

BACKGROUND

Portable wide-angle image capture devices have recently become commercially available. These devices can capture 360° output images by stitching together two or more wide-angle video streams. The resulting video streams assembled from two or more such 360° output images can be used to place a viewer, visually, inside a sphere that provides a 360° view of the captured scene, or may otherwise provide access to an entire captured scene, even as the image capture device's orientation may change.

As the orientation of a device changes between successive images, the point of view of the resulting video may change. In some instances, some or all of changes in the point of view may be undesirable, especially when the device is also translating in three-dimensional space between successively-captured images.

BRIEF DESCRIPTION OF THE DRAWINGS

FIG. 3A illustrates a horizon correction mode for the capture of 360° video streams, in accordance with one embodiment.

FIG. 4A illustrates a compass correction mode for the capture of 360° video streams, in accordance with one embodiment.

FIG. 5C illustrates a direction correction mode, with three-dimensional correction capabilities, for the capture of 360° video streams, in accordance with one embodiment.

DETAILED DESCRIPTION

Figure 1:
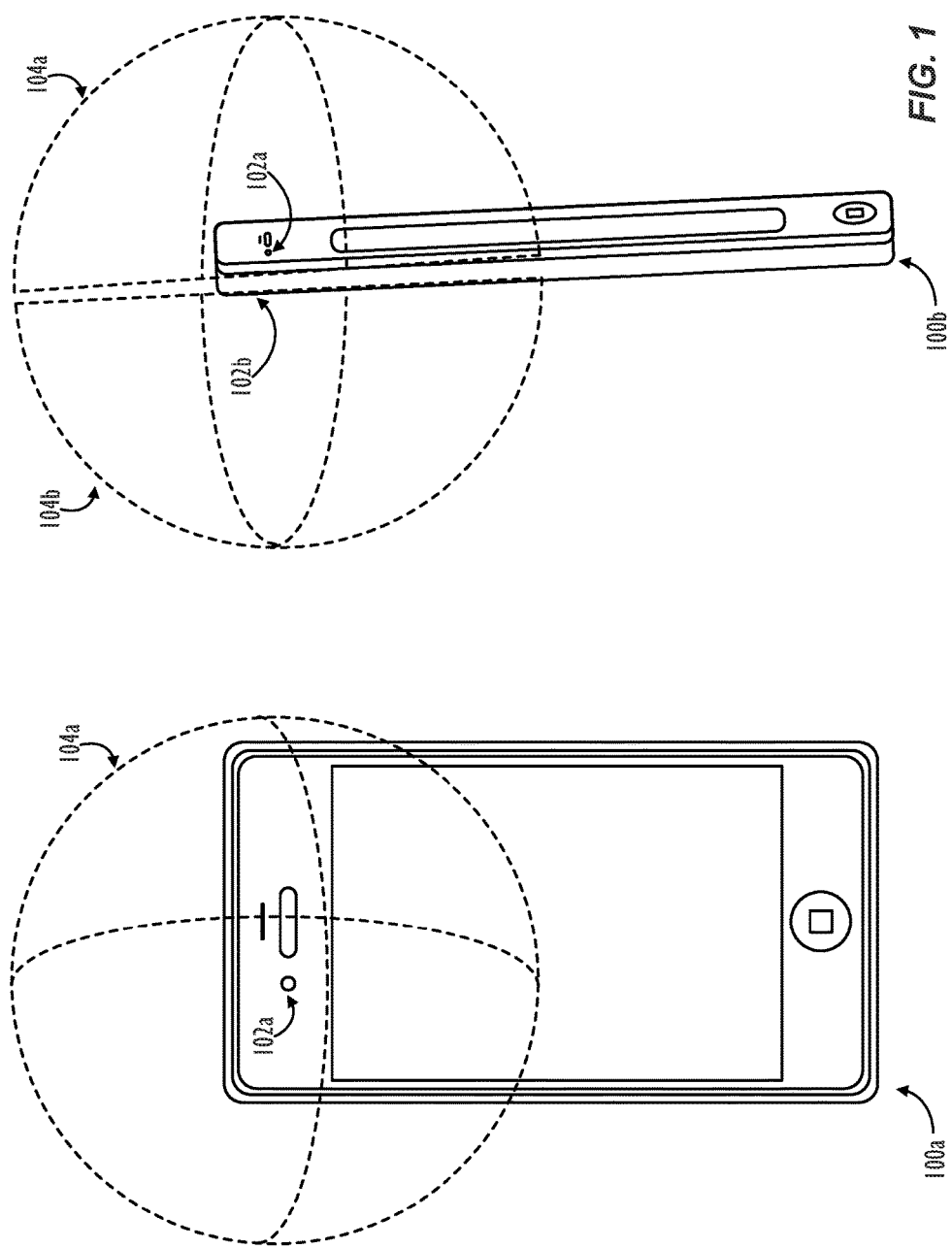
FIG. 1 illustrates an electronic image capture device capable of capturing 360° output images.

This disclosure pertains to systems, methods, and computer readable media to capture, process, and, in some instances, display a stream of spherical images. In general, techniques are disclosed for accounting for translation and/or rotation of an image capture device (e.g., a multi-lens camera) during the capture of a stream of spherical images. More particularly, techniques disclosed herein may analyze the stream of spherical images to correct for the rotation of the image capture device around one or more axes, and, in some variations, may further account for the translation of the image capture device in a common way (e.g., by using information about the translation of the image capture device to adjust the rotation correction according to a set of predetermined rules). In some instances, the identification of an object may be used to adjust rotation correction applied to a captured stream of spherical images.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood, however, that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart.

The language used in this disclosure has been principally selected for readability and instructional purposes, and may not have been selected to delineate or circumscribe the inventive subject matter. Rather, it is the claims presented herein that determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

Embodiments of the image processing techniques set forth herein can assist with improving the functionality of computing devices or systems that capture, process, and/or display 360° image sequences. Computer functionality may be improved by enabling such computing devices or systems to stabilize and produce image streams more effectively than prior art systems, and in a manner which may be more visually interesting and/or consistent with a user's intended point of view for the image stream. Computer functionality can also be improved by stabilizing an otherwise unstabilized image stream, making such an image stream more useful to individuals or subsequent image processing operations. This is because a stabilized image stream may consume less memory and may be more visually interesting and/or consistent with what human viewers of the 360° image stream are likely to want to see.

While the systems and methods described here discuss capturing 360°/spherical images (which capture the full surroundings of the image capture device), it should be appreciated that the processing techniques may be applied to images that only contain a subset of the surroundings of the image capture device, such as a hemi-spherical image (in which half, or 180°, of the surroundings of the image capture device are captured) or another semi-spherical image, although there may, in some instances, be limitations to the amount of rotation correction that may occur if only a subset of the surroundings are captured.

Additionally, it should be appreciated that a video that is captured and/or displayed may include only a subset of the scene captured by the image capture device. For example, an image capture device may capture a spherical image but may only store a subset (e.g., corresponding to a given field of view and/or point of view) of the image. Similarly, only a portion of a stored image may be displayed to a user during playback. In these instances, it may be possible for the user to access other portions of the stored images to change the field of view and/or point of view that is displayed.

Referring now to FIG. 1, the various cameras 102 of an exemplary electronic image capture device 100 capable of capturing 360° output images are illustrated. As shown in view 100a of the image capture device 100 in FIG. 1, there may be a first camera 102a on a first side of the electronic image capture device 100 that is capable of capturing images having a spherical, hemi-spherical, or other sized field of view. As illustrated in FIG. 1, first camera 102a is configured to capture a hemispherical field of view 104a that is on the 'display side' or 'front-facing' side of image capture device 100. As is displayed more clearly in the context of the side view 100b of image capture device 100 in FIG. 1, there may also be a second camera 102b, e.g., on a second side of the electronic image capture device 100 that is capable of capturing images having a spherical, hemi-spherical, or other sized field of view. As illustrated in FIG. 1, second camera 102b is configured to capture a hemispherical field of view 104b that is on the 'rear side' or tack-facing' side of image capture device 100. As may now be more clearly understood, the 360° output image that is stored for any moment in time during the image capture process may be constructed by combining the simultaneously captured fields of view from two or more cameras (e.g., cameras 102a and 102b) of the electronic image capture device. The use of two cameras with hemispherical fields of view in FIG. 1 is merely exemplary. In other embodiments, the 360° output images may also be formed by combining the fields of view of three or more cameras of the electronic image capture device. The positioning of the various cameras on the body of the electronic image capture device may be configured so that they have a combined field of view large enough to create a full 360° output image for any given moment in time.

Figure 2A:
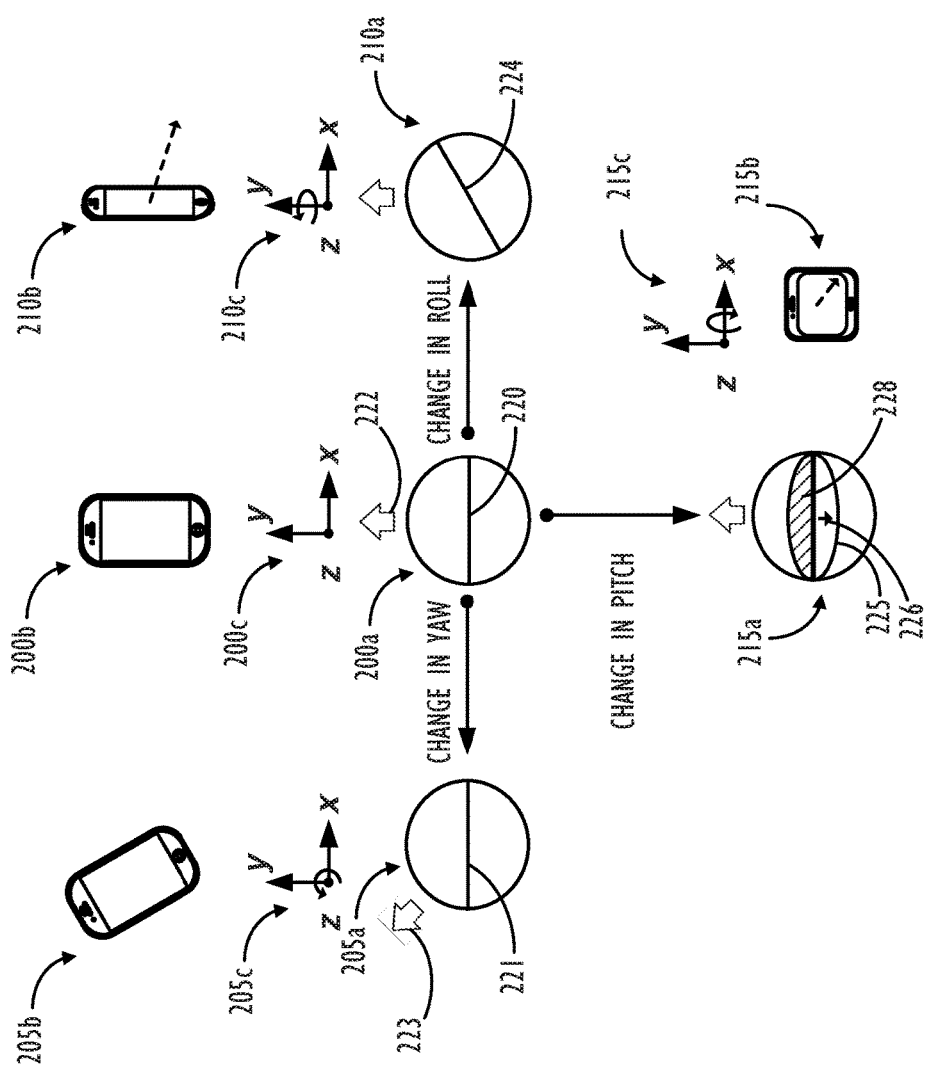
FIG. 2A illustrates various changes in orientation of an electronic image capture device about its central axes.

Referring now to FIG. 2A, the impact of various changes in orientation of an electronic image capture device relative to a reference position is illustrated. As mentioned above, the exemplary image capture devices described herein are capable of (and configured to) capture and generate images as discussed above. As shown in FIG. 2A, the space surrounding the image capture device may be represented by three mutually-perpendicular coordinate axes (labeled x, y, and z). Associated with each image may be an amount of rotation about any (or all) of the camera's three central axes (e.g., denoted by a degrees notation) relative to a reference position. As the device translates in space (e.g., along one or more axes), there may also be a relative translation between successive images in any (or all) of the three axial directions. As shown in the example of FIG. 2A, the image capture device may start off in a reference position 200. The set of three axes 200c represent the assigned directions of each of the x-, y-, and z-axes in FIG. 2A. In this example, the reference position 200 may be thought of as the image capture device (e.g., mobile phone 200b) laying flat on a table top surface. Of course, this reference position is meant for illustrative purposes only, and the image capture device may have any desired reference position for a given implementation.

Figure 2B:
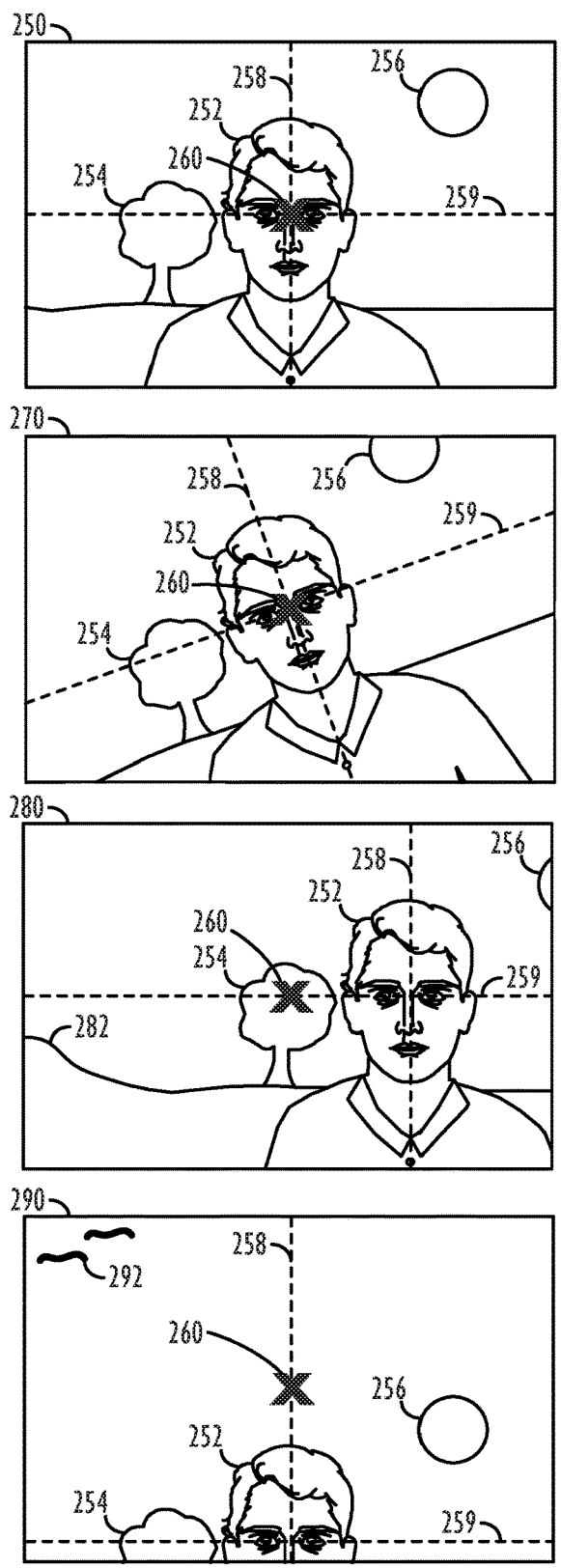
FIG. 2B illustrates changes in the point of view of images captured by the electronic image capture device caused by rotation about its various central axes.

The sphere 200a represents the exemplary reference position 200, in three-dimensional space, of the image capture device, according to a notation convention that will be described further herein. In this notation convention, a reference image that would be captured would have a point of view centered on the intersection of mutually perpendicular yaw and pitch lines, with the yaw line vertical and the pitch line horizontal. Illustration 250 of FIG. 2B represents such an exemplary reference image, having point of view 260 marked with an 'x' and a mutually perpendicular yaw line 258 and pitch line 259. The captured reference image 250 in this example comprises a human subject 252, a tree 254, and a Sun object 256. As will be described below, rotation of the image capture device about its various axes will affect the default display position of human subject 252, tree 254, and Sun object 256 in the assembled 360° video sequence.

Turning back to FIG. 2A, the angle of the line 220 across the diameter of sphere 200a represents the amount or roll (i.e., rotation around the y-axis), the width of the line (e.g., whether it is represented as thin line or a bulging disc in the center of the sphere) represents the amount of pitch (i.e., rotation around the x-axis), while the direction of arrow 222 indicates the amount of yaw (i.e., rotation around the z axis). Accordingly, in the reference position 200, the line is horizontal and has a minimum thickness, and the arrow points directly along the y-axis, which represent a reference roll, a reference pitch, and a reference yaw, respectively.

Moving next to sphere 205a, a change in "yaw" from the image capture device's starting position is illustrated. In particular, changes in yaw represent a rotation around the z-axis, as reflected by the semi-circular arrow shown in axes 205c, and as illustrated by a change in image capture device orientation in illustration 205b. When compared to sphere 200a, sphere 205a has the same line 221 angle and width as line 220 of sphere 200a, reflecting the fact that the device has not been rotated about either the x- or y-axis during the transition from position 200b to position 205b. However, the rotation around the z-axis is illustrated by a shift in the direction of the arrow 223 (shown in FIG. 2A as an approximately 45-degree rotation relative to the reference position). When an image is captured in this position, as shown in illustration 280 of FIG. 2B, the point of view 260 may be shifted to the side of the yaw line 258. Because there has not been a change in pitch or roll, however, the point of view 260 in illustration 280 is still positioned along the pitch line 259, and the pitch line 259 remains horizontal. The change in yaw of the image capture device may reveal new objects in the default field of view of the captured scene, e.g., as illustrated by the hill 282 in illustration 280 that was not visible in the reference image 250.

Moving next to sphere 210a, a change in "roll" from the image capture device's starting position is illustrated. In particular, changes in roll represent a rotation around the y-axis, as reflected by the semi-circular arrow shown in axes 210c, and as illustrated by a change in image capture device orientation in illustration 210b. When compared to sphere 200a, the line 224 of sphere 210a has a different angle, but the same thickness, reflecting the fact that the device has been rotated about the y-axis during the transition from position 200b to position 210b. The relative angle of the line 224 may represent the amount of rotation around the y-axis of the image capture device relative to the reference position (e.g., sphere 210a in FIG. 2 shows an approximately 45-degree rotation). When an image is captured in this position, as shown in illustration 270 of FIG. 2B, the perspective may be altered such that the angle of the pitch line 259 and yaw line 258 are changed. Because there has not been a change in pitch or yaw, the point of view 260 in illustration 270 may still be centered at the intersection of pitch line 259 and yaw line 258.

Finally, moving to sphere 215a, a change in "pitch" from the image capture device's starting position is illustrated. In particular, changes in pitch represent a rotation around the x-axis, as reflected by the by the semi-circular arrow shown in axes 215c, and as illustrated by a change in image capture device orientation in illustration 215b. When compared to sphere 200a, the thickness of line may be increased to form a disc 225. The disc may include a first diagonally-shaded portion 228 and a second portion including directional arrow 226 to indicate that the image capture device has been tilted in a first direction (e.g., towards the sky). Reversing the position of the first and second portions reflect a tilt in the opposite direction (e.g., toward the ground). The relative thickness of the line 225 may represent the amount of rotation around the x-axis of the image capture device relative to the reference position (e.g., sphere 215a in FIG. 2A shows an approximately 45-degree rotation). When an image is captured in this position, as shown in illustration 290 of FIG. 2B, the point of view 260 may be shifted above the pitch line 259. Because there has not been a change in yaw or roll, however, the point of view 260 in illustration 290 is still positioned along the yaw line 258, and the pitch line 259 remains horizontal. The change in pitch of the image capture device may reveal new objects in the default field of view of the captured scene, e.g., as illustrated by the birds 292 in illustration 290 that was not visible in the reference image 250.

While changes in yaw, pitch, and roll are each shown separately in FIG. 2A, it should be appreciated that changes in the image capture device's orientation may include changes in any, some, or all of yaw, pitch, and roll. When discussing the capture of an image, the notation convention described above may represent the relative orientation of the image capture device and point of view/perspective of the corresponding image. When discussing a corrected or compensated image, the notation convention may be used to represent the updated point of view/perspective of the corrected image (and a corresponding orientation at which the image capture device would achieve that point of view/perspective during the initial image capture). In these instances, image correction may allow individual images to be treated as if they were obtained at a different device orientation than the orientation at which they were actually captured, as will be discussed in more detail below.

As mentioned above, the correction methods described herein may include correcting for rotation of the capture device around one or more axes. In some instances, the correction does not account for translation of the device (i.e., is 'translation-agnostic') and does not correct for rotation around all three axes. For example, in some instances, a correction mode may correct for rotation in two axes, but not a third. Turning now to FIG. 3A, one such correction mode (referred to herein as "horizon correction mode") for the capture of 360° video streams is illustrated, in accordance with one embodiment. FIG. 3A illustrates how a sequence of images captured sequentially in time (e.g., represented by spheres 305a-305d moving from left to right across the page, and in increasing order of capture time) may be corrected to stabilize for changes in pitch and roll in the video stream. In this correction mode, the point of view/perspective of the captured images may be adjusted to have common pitch and roll orientations (e.g., a reference pitch and a reference roll). For example, a reference position may be selected such that the horizon is level and centered, and the video stream may be corrected such that the corrected images share this characteristic. While the examples here discuss the horizon as a reference for defining the reference pitch and reference roll, it should be appreciated that the correction modes described here may be used to correct to any suitable reference position As shown in an exemplary capture sequence 300 in FIG. 3A, a first image captured, represented by sphere 305a, has a level horizon, but has been pitched forward and yawed to the left about the z-axis (as defined by common coordinate axis system 302). A second image captured, represented by sphere 305b, has a rotated horizon and has been yawed to the right about the z-axis, but has not been pitched. A third image captured, represented by sphere 305c, has a rotated horizon, has been yawed to the left about the z-axis, and has been pitched in a direction opposite that of the first image. Finally, the fourth image captured, represented by sphere 305d, also has a rotated horizon, has been yawed to left about the z-axis, and has been pitched.

In conjunction with the above-described orientation changes of the image capture device during the captures of images 305a-305d, the image capture device has also been translated along motion path 310, although correction mode 320 does not account for this translational motion. In this example, motion path 310 reflects motion of the image capture device in both the x- and y-axis directions (e.g., a person carrying the image capture device may be walking forward and to the right, then laterally to the right, and then backward and to the right. It is to be understood that translation of the image capture device in the z-axial direction during image capture is also possible, although not illustrated in the particular example of FIG. 3A.

After the application of a horizon correction mode to each 360° image captured as a part of capture sequence 300, represented by arrow 315, the corrected orientations of the image capture device for the capture of images 305a-305d are reflected in capture sequence 320, shown as progressing along motion path 330 (which is, in this case, identical to the motion path 310). As shown in capture sequence 320, the first corrected image, represented by sphere 325a, has been adjusted to remove its pitch relative to the reference pitch. Because the roll already matches the reference roll, it is not adjusted. Additionally, because this particular so-called horizon correction mode does not correct for changes in yaw, the yaw is also not adjusted.

Similarly, the second corrected image, represented by sphere 325b, has had its roll corrected to (e.g., rotated so that the horizon is corrected back to level), but has maintained its yaw and pitch (because the pitch already matches the reference pitch). The third corrected image, represented by sphere 325c, has also had its rotated horizon and significant pitch corrected back to level, while maintaining its original yaw rotation. Finally, the fourth corrected image, represented by sphere 325d, has also had its rotated horizon and pitch corrected back to level, while maintaining its original yaw rotation. Thus, as may now be more clearly understood, the exemplary horizon correction mode illustrated in FIG. 3A corrects the captured images to stabilize the position of the horizon in the assembled video sequence (both in terms of pitch and roll), but allow the assembled video sequence to be reflective of the user's changes in the image capture device's yaw during the capture of the 360° images.

One concrete example where a horizon correction mode may be useful is the situation where an image capture device may be mounted to the helmet of a user riding a bicycle. As the rider looks to the left and right during the bicycle ride, the assembled video sequence may be updated with the change in yaw to show the scenery off to the user's left and right that he turned his head to look at while riding the bike, but the assembled video sequence may be 'corrected' to give the impression that rider was always keeping his helmet level with the horizon, i.e., even if, in reality, the rider tilted his head up or down (i.e., representing a change in pitch) or rolled his head from side to side (i.e., representing a change in roll) during the bicycle ride.

In some instances, however, changes in yaw may be undesirable. In the example of a bicyclist wearing a head-mounted image capture device, the bicyclist may be frequently and quickly moving his head side-to-side to monitor his surroundings, which may cause the resulting video to appear jerky as a result of the quick and frequent changes in yaw. Accordingly, in some instances, the correction modes described here may correct for rotation in all three axes, i.e., pitch, yaw, and roll.

In some instances, the reference pitch and/or roll used for the image capture device may change over successive frames, and, in some instances, this may be based on a desire to 'track' a particular object within the scene. In these instances, the reference pitch and roll may be defined on a frame-to-frame basis, based on an identification of the location and/or orientation of the object, as determined from an analysis of the captured image.

Figure 3B:
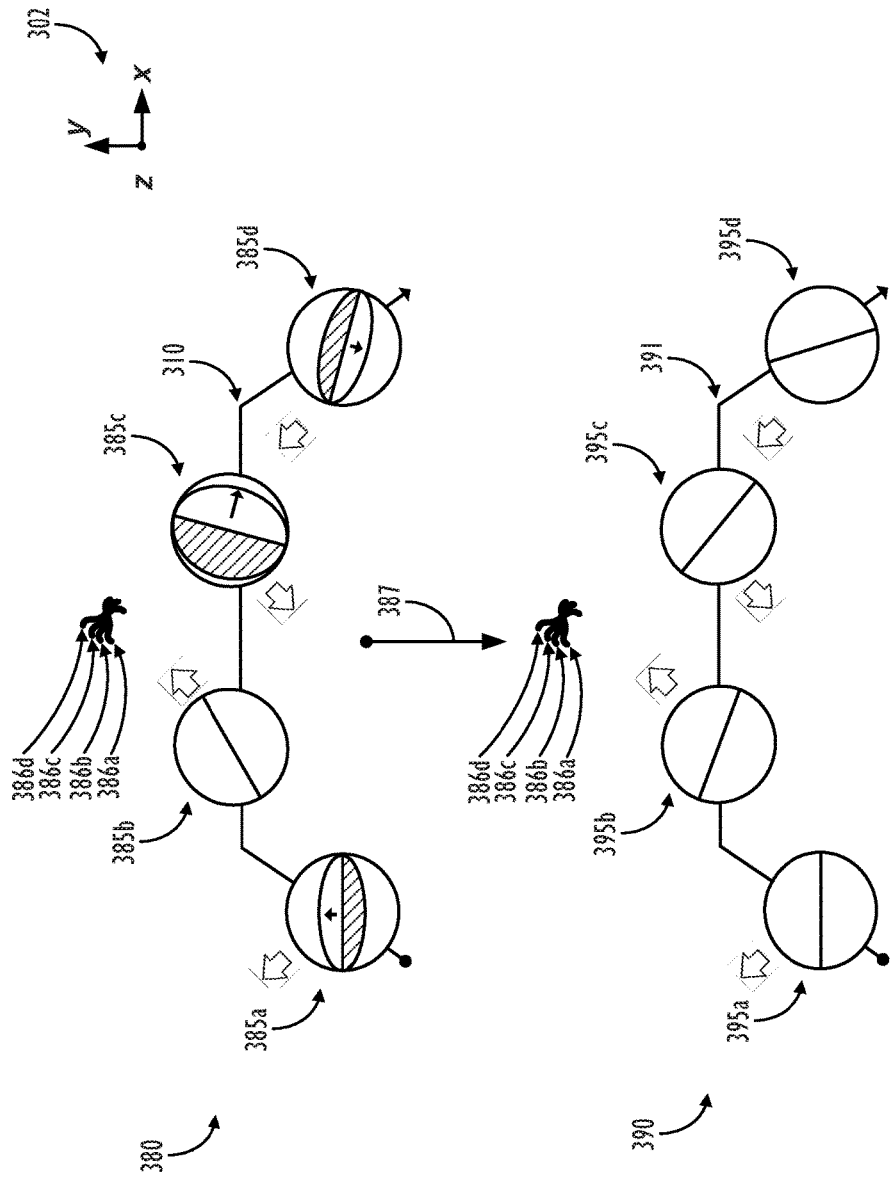
FIG. 3B illustrates a horizon correction mode, with object-locking, for the capture of 360° video streams, in accordance with one embodiment.

Turning now to FIG. 3B, a modified horizon correction mode with so-called 'object-locking' for the capture of 360° video streams is illustrated, in accordance with one embodiment. In the example of FIG. 3B, an object (e.g., bird 386) is treated as a "reference horizon" for pitch and/or roll correction, rather than using the actual horizon in the scene. For example, the pitch of the image capture device may be altered to keep the object centered within the field of view, but the roll may no longer be corrected to the level of the horizon (as in a normal horizon correction mode).

The capture sequence 380, comprising images 385a-385d, is identical to the capture sequence 300, comprising images 305a-305d, described above with reference to FIG. 3A. The difference between FIG. 3A and FIG. 3B is in the fact that the roll of the image capture device will be corrected to the present orientation of the object of interest (e.g., bird 386) at the moment of capture of each constituent 360° image. As is illustrated, the bird has orientation 386a at the time of capture of image 385a (i.e., level with the actual horizon), orientation 386b (i.e., tilted slightly to the right) at the time of capture of image 385b, orientation 386c (i.e., tilted slightly more to the right) at the time of capture of image 385c, and orientation 386d (i.e., tilted to where the bird is flying with its wingspan nearly vertical) at the time of capture of image 385d.

Thus, in the modified horizon correction with object-locking mode (the application of which is represented by arrow 387), as illustrated in capture sequence 390 of FIG. 3B, and comprising images 395a-395d captured along motion path 391, the roll of the corrected images are corrected to match the "horizon" of the wingspan of bird 396 at the corresponding moment in time. In other words, the bird 396 in the resultant corrected assembled video sequence will remain level in the center of the video frame, as the "rest of the world" appears to spin around the bird 396.

In other object-locking correction mode embodiments (such as when the object is moving), both the pitch and roll of the image capture device may be altered to keep the object centered and in a particular orientation. In still other object-locking embodiments, the yaw of the image capture device may be corrected to follow the object, but the pitch and/or roll may follow the motion trajectory of the camera.

Turning now to FIG. 4A, a correction mode configured to stabilize the location and appearance of the horizon in the assembled video stream, while simultaneously maintaining a constant yaw angle (i.e., removing changes in the pitch, roll, and yaw of the image capture device) is illustrated, in accordance with one embodiment. This mode is also referred to herein as a 'compass correction' mode. The capture sequence 400, comprising images 385a-385d, is identical to the capture sequence 380 described above with reference to FIG. 3B. In the compass correction mode (the application of which is represented by arrow 405), illustrated in capture sequence 420 of FIG. 4A, and comprising images 425a-425d captured along motion path 421, the horizon of the corrected images are corrected in terms of pitch and roll to match the real world horizon (or other desired reference pitch and roll angles), as in the horizon correction modes of FIGS. 3A-3B, but, rather than allowing the assembled video sequence to be reflective of the changes in yaw of the image capture device, the captured images are also corrected so as to remove variations in yaw. The result of the compass correction mode as applied to a captured sequence of images is a stabilized video sequence that always points in a particular (e.g., predetermined) direction, regardless of where an object of potential interest (e.g., bird 386) may be located within the scene relative to the image capture device.

Figure 4B:
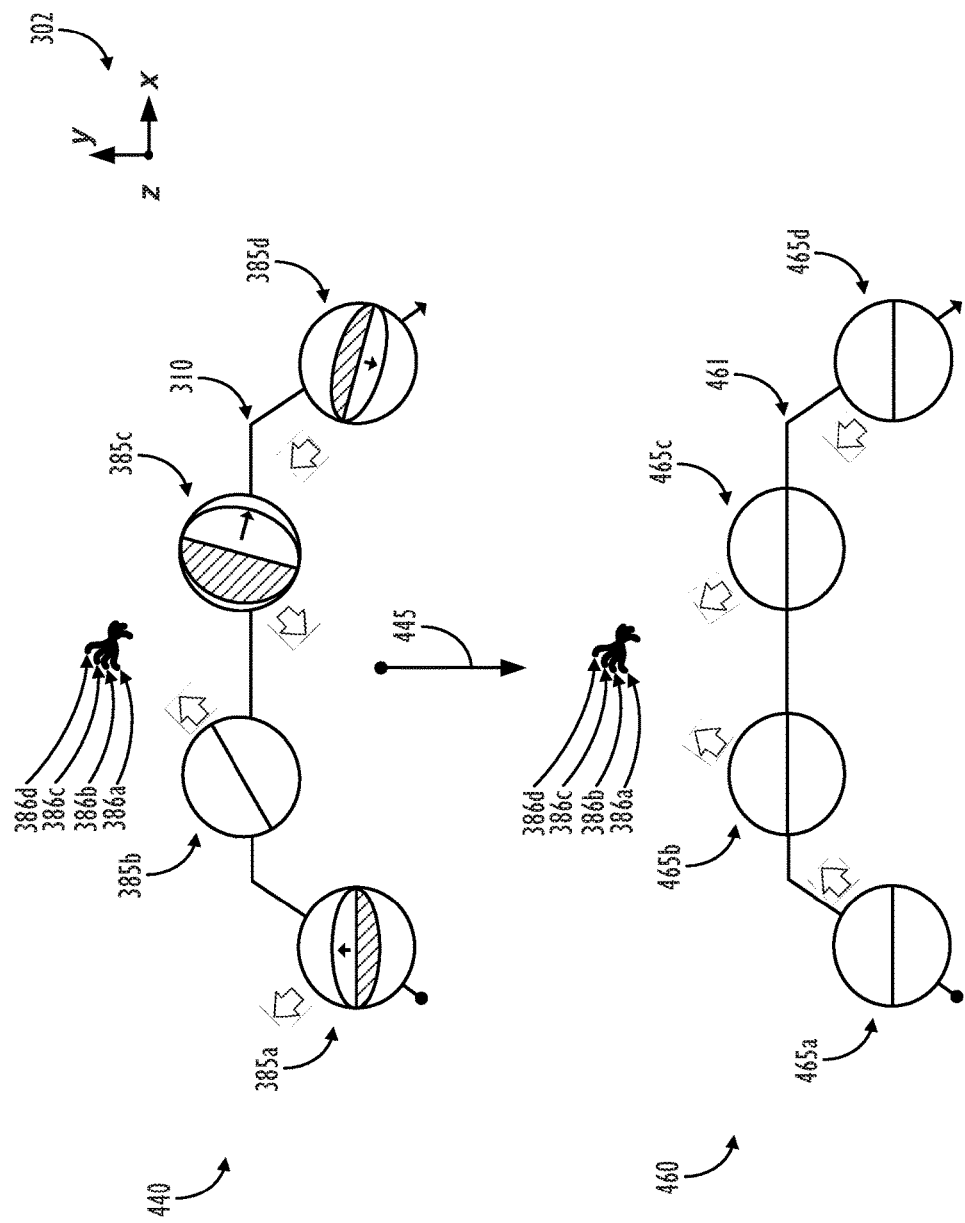
FIG. 4B illustrates a compass correction mode, with object-locking, for the capture of 360° video streams, in accordance with one embodiment.

Turning now to FIG. 4B, a correction mode configured to stabilize the location and appearance of the horizon in the assembled video stream (i.e., removing changes in the pitch and roll of the image capture device), while simultaneously changing a reference yaw angle to track an object of interest (e.g., bird 386) is illustrated, in accordance with one embodiment. This mode is also referred to herein as a 'compass correction mode with object-locking.' The capture sequence 440, comprising images 385a-385d, is identical to the capture sequence 380 described above with reference to FIG. 3B. In the compass correction mode with object-locking (the application of which is represented by arrow 445), illustrated in capture sequence 460 of FIG. 4B, and comprising images 465a-465d captured along motion path 461, the horizon of the corrected images are still corrected in terms of pitch and roll to match the real world horizon (or other desired reference pitch and roll angles), as in the horizon correction modes of FIGS. 3A-3B and the compass correction mode of FIG. 4A, but, rather than removing all variations in yaw (as in the compass correction mode of FIG. 4A), the compass correction mode with object-locking capture sequence 460 corrects the yaw of the images used in the resultant assembled video sequence so as to 'lock' onto the object of interest, in this case, bird 386. As mentioned above, bird 386 has been drawn in a single, common location in four versions, 386a-386d (corresponding to the orientation of the bird 386 at the time of capture of images 465a-465d, respectively), to represent the fact that the bird has simply rotated in place during the capture of the images, and has not translated in the x-y plane during the capture of the images. Thus, as illustrated by capture sequence 460, the result of the compass correction mode with object-locking, as applied to the captured sequence of images 465a-465d, is a stabilized video sequence that always points in the direction of the object of interest, as evidenced by the fact that the white arrows above spheres 465a-465d (representing the yaw of the image capture device) continually point towards the object of interest, i.e., bird 386, rather than always pointing in a common direction. In other words, in this compass correction mode with object-locking, the position of the locked object of interest at any moment in time is selected as 'translational stabilization point' (i.e., a point defined by one or more of a reference pitch angle, reference yaw angle, and reference roll angle) for the correction of the assembled 360° video sequence.

As may now be understood, in some embodiments, one or more of the reference angles used to define the translational stabilization point may be affected by the image capture device's translational motion through three-dimensional space. Further, the reference pitch and reference roll for a given translational stabilization point may be set based on a common reference (such as in the horizon correction mode, described above with reference to FIG. 3A), or may be based on the position and/or orientation of an object of interest (such as in the horizon correction mode with object-locking, described above with reference to FIG. 3B). In still other embodiments, the reference pitch and roll may not be corrected at all, allowing the reference view of the resultant assembled video sequence to move and 'track' the changes in pitch and roll of the image capture device itself during the capture of the constituent images of the resultant assembled video sequence.

In some embodiments, the 'locked' object may be continuously tracked (e.g., via image processing) across the capture of the images. There may also be one or more default behaviors when the locked object is no longer in the visible view (e.g., due to being hidden behind another object) in the video sequence that will be displayed to a user. For example, the video sequence may be corrected so as to continue 'looking' in the direction of the last known location of the object. Alternately, a location may be set from an initial detection of the object, and the determined location may be used—even if the object is not in sight any longer. This location can include an approximation of the object's location in the x-y plane, and may also take into account the motion path of the image capture device. As yet another example, the position of the object may be extrapolated during the times that it is no longer in the visible view based on, e.g., the last known position of the object, the position where the object next became visible (e.g., in the event that the video sequence is being corrected in post-processing), the estimated speed and/or trajectory of the object, the estimated speed and/or trajectory of the image capture device, etc. Finally, the image capture device may simply change over into a different correction mode if the object of interest can no longer be located over a predetermined number of frames.

Figure 5A:
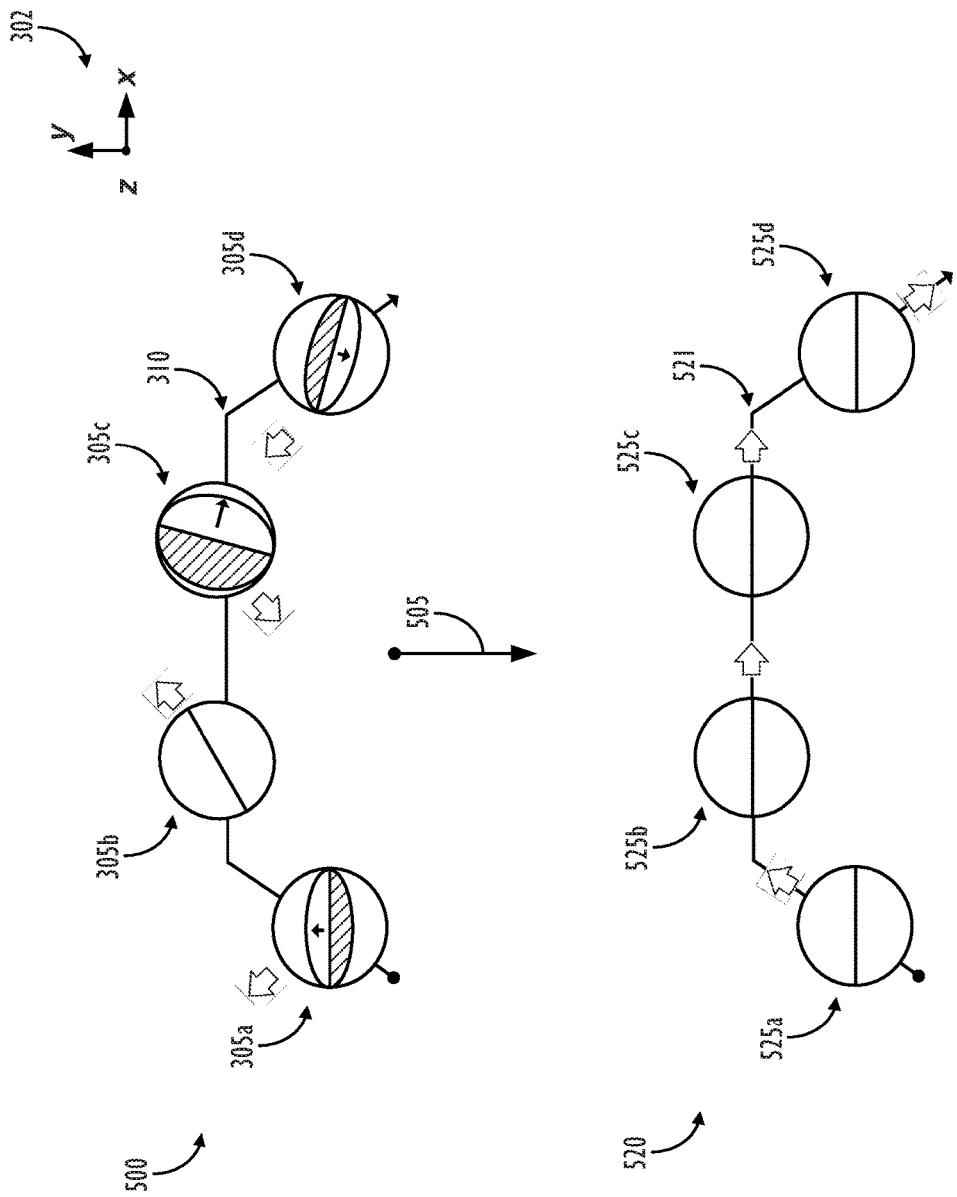
FIG. 5A illustrates a direction correction mode, with horizon-locking, for the capture of 360° video streams, in accordance with one embodiment.

Turning now to FIG. 5A, a correction mode wherein the image stream may be corrected to stabilize the assembled video stream in two rotational axial directions, while simultaneously maintaining a yaw angle that tracks the trajectory of the image capture device three-dimensional space is illustrated, in accordance with one embodiment. This mode is also referred to herein as a 'direction correction mode with horizon-locking.' The capture sequence 500, comprising images 305a-305d, is identical to the capture sequence 300 described above with reference to FIG. 3A. In the direction correction mode with horizon-locking (the application of which is represented by arrow 505), illustrated in capture sequence 520 of FIG. 5A, and comprising images 525a-525d captured along motion path 521, the horizon of the corrected images are still corrected in terms of pitch and roll to match the real world horizon, but the yaw of the device is corrected to follow the real-world motion trajectory of the image capture device as it translates in the x-y plane. This so-called 'translation-aware' correction is reflected in FIG. 5A by the fact that the white yaw arrows above spheres 525a-525d track along the motion path 521, indicating that the reference view in the assembled video sequence will always appear to be "looking" in the direction (i.e., yaw angle) of the translation of the image capture device during the capture of the corresponding images.

Figure 5B:
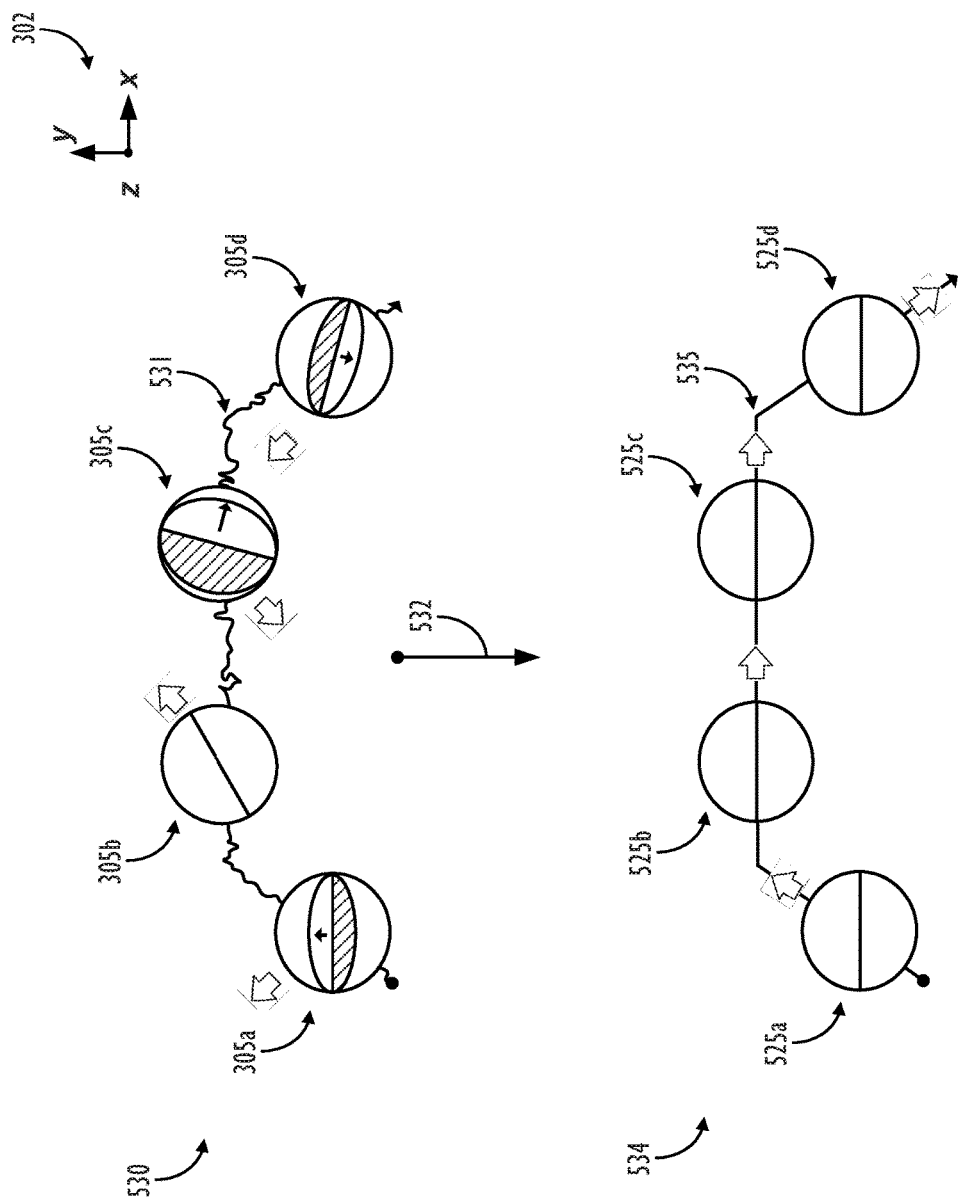
FIG. 5B illustrates a direction correction mode, with motion path filtering, for the capture of 360° video streams, in accordance with one embodiment.

When the correction modes described herein account for translation of the image capture device, it should be appreciated that a motion path that is used by the correction mode may not reflect the exact motion path traversed by the image capture device. Turning now to FIG. 5B, a direction correction mode with horizon locking and motion path filtering is illustrated, in accordance with one embodiment. The capture sequence 530, is identical to the capture sequence 300, comprising images 305a-305d, described above with reference to FIG. 5A. The difference between FIG. 5A and FIG. 5B is in the motion path taken by the user of the image capture device during the capture of the four sequential images. In particular, motion path 310 of FIG. 5A is shown as a smooth path, representing the user walking forward and to the right, then laterally to the right, and then backward and to the right. The motion path 531 of FIG. 5B is more representative of the realistic path that an image capture device may take while capturing images, reflective of minor variations in position caused by hand shake and/or other minor movements of the image capture device during the capture of the images.

In the direction correction mode with horizon locking and motion path filtering, illustrated in capture sequence 534 of FIG. 5B, and comprising images 525a-525d, the motion path 535 may be a filtered (or estimated) version of the original motion path, in this case, motion path 531. In other words, the minor deviations in the original motion path 531 may be filtered or smoothed out of the motion path that is ultimately used by the video correction algorithm. Thus, the motion path that is actually used to perform the video correction may not follow the exact motion path followed by the image capture device, but may be a filtered version that allows for the production of a more smooth and/or visually pleasing assembled video. The corrected versions of images 525a-525d in FIG. 5B may thus appear otherwise indistinguishable in the final assembled video sequence from the corrected versions of images 525a-525d shown in FIG. 5A (i.e., correcting the horizons of the captured images for pitch and roll, while tracking the device's translation via changes in yaw), assuming that filtered motion path 535 in FIG. 5B ended up being identical to motion path 521 in FIG. 5A.

Turning now to FIG. 5C, a correction mode wherein the image stream may be corrected to stabilize the assembled video stream in one rotational axial direction (e.g., roll), while simultaneously maintaining pitch and yaw angles that track the trajectory of the image capture device in three-dimensional space is illustrated, in accordance with one embodiment. This mode is also referred to herein as a 'direction correction mode with three-dimensional correction capabilities.' The capture sequence 540, comprising images 545a-545d, is similar to the capture sequence 300 described above with reference to FIG. 3A, with the exception being that the relative width of motion path 550 indicates either an increase or decrease in the position of the image capture device along the defined z-axis. In other words, in the example of FIG. 5B, at the beginning of motion path 550, the image capture device is moving in the positive (or, increasing) z-axis direction (e.g., raising the image capture device up higher off the ground) as the user moves forward and to the right. Then, the user holds the image capture device at a constant z-position as the translation continues to the right, before finally again moving the image capture device in the negative (or, decreasing) z-axis direction (e.g., lowering the image capture device to be closer to the ground) as the user moves backwards and to the right to finish the capture sequence 540.

In the direction correction mode with three-dimensional correction capabilities, illustrated in capture sequence 560 of FIG. 5C, and comprising images 565a-565d captured along motion path 561, the horizon of the corrected images are still corrected in terms of roll to match the real world horizon, but the pitch and yaw of the image capture device are corrected to follow the real-world motion trajectory of the image captured device in three-dimensional space, as represented by the white yaw arrows above spheres 565a-565d tracking along the motion path 561 and the pitch lines of spheres 565a-565d tracking the changes in z-axial position of the motion path 561, indicating that the reference view in the assembled video sequence will always appear to be "looking" in the direction of the movement of the image capture device (i.e., in terms of yaw angle and pitch angle) during the capture of the corresponding images that will constitute the assembled 360° video stream. In other words, the pitch angle and yaw angle of the translation of the image capture device at any moment in time are selected as the rotational references values, i.e., the translational stabilization point, in this three-dimensional direction correction mode.

In still other embodiments, the pitch, roll, and yaw of the translational path of the image capture device could each be used as rotational reference values defining the translational stabilization point, such that the default view of the assembled video sequence follows the real-world motion trajectory of the image capture device in three-dimensional space (i.e., rather than using a common reference value over time, such as the location of the horizon or a common direction).

Each of the various correction modes described above may be explicitly selected by a user of the image capture device. Alternately, there may be a "default" correction mode for when the video sequence is captured, and/or additional modes may be implemented in post-processing, i.e., on an already-stored video (which video may be saved, along with metadata in the form of motion information, e.g., accelerometer, altimeter, compass, and/or gyrometer information, corresponding to the position of the image capture device in three-dimensional space over the course of capturing the constituent 360° images of the video stream) to re-correct the content of the assembled video in a different manner. Corrections could also be performed in 'near-real time' by storing the captured 360° images in a buffer and performing the correction processing while the next images are being captured. In such 'near-real time' instances, it may be beneficial to discard some amount of the captured image information once some portion of the stabilization corrections have been performed on a given image and it has been determined that a portion of the given image's view will not be needed in the resultant assembled video. Still other correction modes are possible that are not explicitly described herein, e.g., by combining, adding, or removing various aspects of the different correction modes described herein to suit the needs of a particular 360° video capture implementation.

Figure 6:
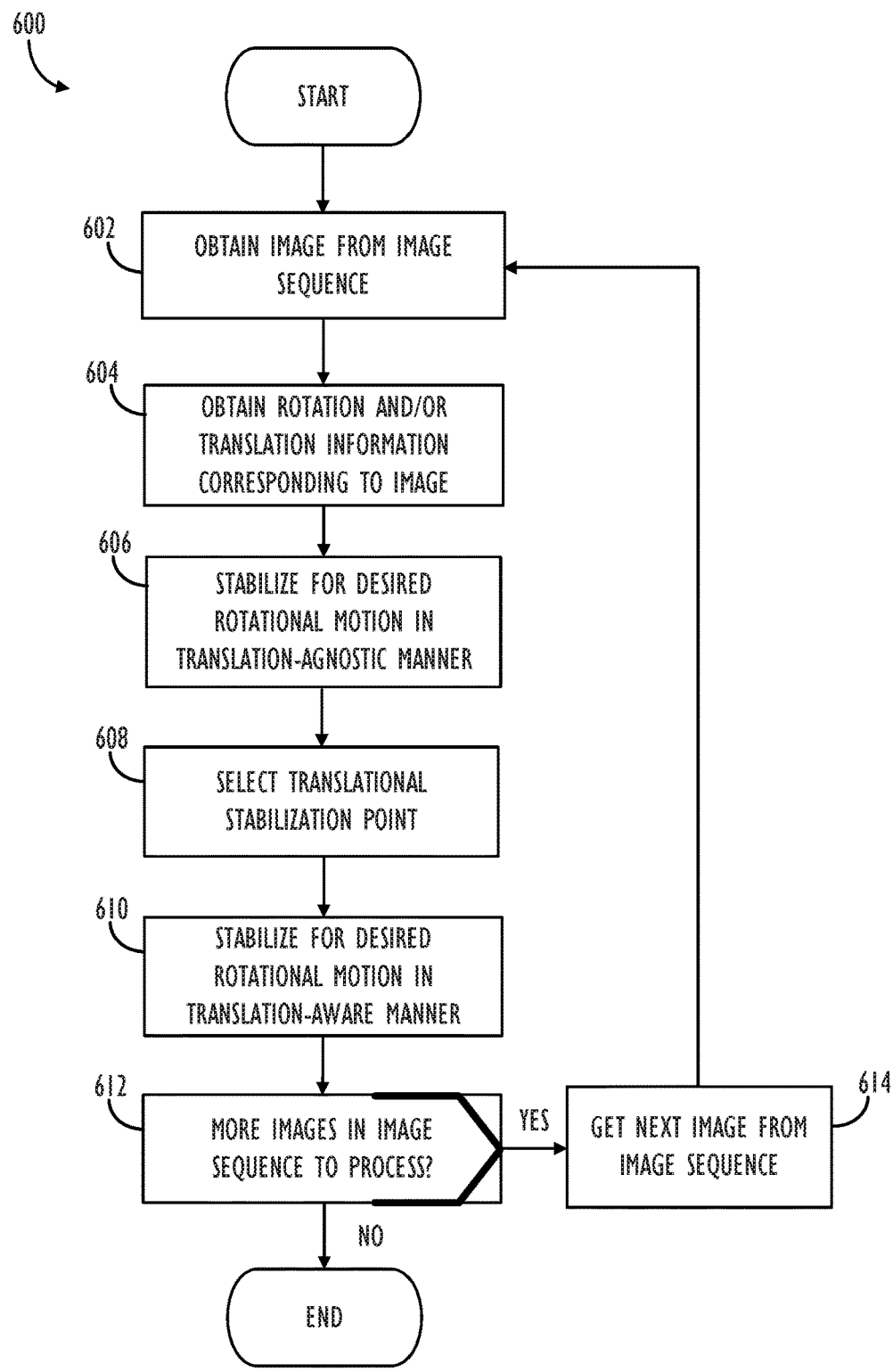
FIG. 6 illustrates, in flowchart form, a video processing operation, in accordance with one embodiment.

Referring now to FIG. 6, video processing operation 600, in accordance with one embodiment, obtains an image sequence comprising a number of 360° images, e.g., of the type described above (block 602). Rotation and/or translation information corresponding to each image in the obtained sequence may then be obtained (block 604). Illustrative types of image information obtained may include, but are not limited to, gyroscope sensor output for absolute orientation information related to the capture of the image, accelerometer sensor output for determining how fast around each axis (e.g., the x-, y- and z-axes) the image capture device was being moved during the capture of the image, and GPS or altimeter sensor output for absolute location and/or altitude information related to the image. Known techniques may be used to convert the accelerometer, gyroscope, GPS, altimeter, etc. information corresponding to each image in the capture sequence into the motion path information referred to above. For example, accelerating the image capture device in a particular direction, while the image capture device is in a particular orientation, for a particular amount of time, will result in the image capture device being moved along a derivable trajectory over a known time period, which time period will correspond to the timestamps of the various constituent images making up the image sequence. In other embodiments, image processing may be performed on the content of the image itself to determine, e.g., the movement of an object of interest within the scene relative to the known movement of the image capture device during the same time period.

As discussed with respect to the various correction modes described above, the rotational and/or translational information obtained for each image may be used to compensate for the rotation of the image device (e.g., in one or more desired axial directions) between successive images or frames in a translation-agnostic manner (block 606), i.e., the compensation for the rotation of the image capture device in block 606 would be applied in the same manner no matter which direction the image capture device is translating in three-dimensional space (or, indeed, if the image capture device is not translating at all). An example of a translation-agnostic rotational stabilization is the correction of the pitch and roll in the 'horizon correction' mode of FIG. 3A. In other words, no matter whether the user of the image capture device is walking forward, walking to the right, or raising up the image captured device, the reference view of the horizon in the resultant video sequence will remain level and centered in the middle of the frame.

Next, a translational stabilization point may be chosen (block 608). As described above, the translational stabilization point may be defined by one or more of a reference pitch, reference yaw, and reference roll. In one embodiment, the horizon in the scene may be chosen as the translational stabilization point. In such embodiments, the reference pitch and reference roll of the translational stabilization point may be locked in to the pitch and roll, respectively, of the horizon (which, presumably, is not moving in the scene over time). In other embodiments, the translational stabilization point may always be selected to be in a particular direction, which may thus be defined in terms of a reference yaw angle. In another embodiment, an object of interest (e.g., a face, an animal, a landmark building, etc.) may be identified and used to as the translational stabilization point over a series of consecutive images. The reference pitch, yaw, and/or roll may thus need to be updated over time as the pitch, yaw, and/or roll of the object of interest changes over time. In general, it has been found beneficial to stabilize translational movements between consecutive frames of the obtained image sequence by selecting an object that is determined to be both distant and present in at least a specified number of consecutive frames as a translational stabilization point.

Image analysis may also be applied to locate and/or track an identified object of interest over time. In some embodiments, the identified object may be in at least a first specified number of consecutive frames in the image sequence. In other embodiments, the identified object may be in a second specified number of semi-consecutive frames, where "semi-consecutive" means the identified object is missing from no more than the second specified number of consecutive frames in a larger consecutive series of frames. By way of example, if the first specified number is 30 and the second specified number is 1, then, in a sequence of 30 frames, the identified object (e.g., a face) could be missing from no more than 1 frame at a time; that is, the number of frames between frames in which the identified object is found can be no more than 1. According to some embodiments, an object missing for more than the second specified number of frames may be considered to have a position of the last-known object location, or an extrapolation between the last-known and next-known location of the object of interest, in the frames from which it is missing.

Once a translational stabilization point has been chosen, the current frame may be stabilized for the desired rotational motion in a translation-aware manner, based on the selected translational stabilization point (block 610). Translation-aware means that, e.g., the compensation for the rotation of the image capture device in block 610 would be done differently, based, at least in part, on the direction the image capture device was translating in three-dimensional space at the time of capture of the 360° image. An example of a translation-aware rotational stabilization is the correction of the pitch and yaw in the 'direction correction' mode with three-dimensional correction capabilities of FIG. 5C. In particular, based on whether the user of the image capture device is walking forward, walking to the right, or raising up the image captured device, the reference view in the resultant video sequence will be updated to reflect the motion path by which the user of the image capture device translated through three-dimensional space. In other words, the reference pitch and reference yaw defining the translational stabilization point for any given image being corrected using the 'direction correction' mode of FIG. 5C would be set equal to the pitch and yaw of the image capture device's translational motion path during the capture of the given image.

Once stabilized for the desired translational and/or rotational changes of the image capture device during the capture of the current image, a check may be made to determine if additional images need to be processed (block 612). If additional images from the obtained sequence remain to be processed (the "YES" prong of block 612), the next image may be obtained (block 614), and then operation 600 continues by returning to block 602. If the obtained sequence has been completely processed (the "NO" prong of block 612), stabilized and corrected output assembled video sequence may be stored to memory and/or output for display, and the operation 600 may end. In one embodiment, video processing operation 600 may be performed by an application program, e.g., utilizing software, firmware, hardware components, or a combination thereof. The correction applied by stabilization operations 606 and 608 may be thought of as generating "anti-motion" descriptors for each image or frame, through which each pixel in the image or frame may be mapped, so as to remove the undesired rotation while accounting for the translation of the image capture device (if so desired) during the capture of each such image or frame in a common, e.g., predetermined or selected, way.

Figure 7:
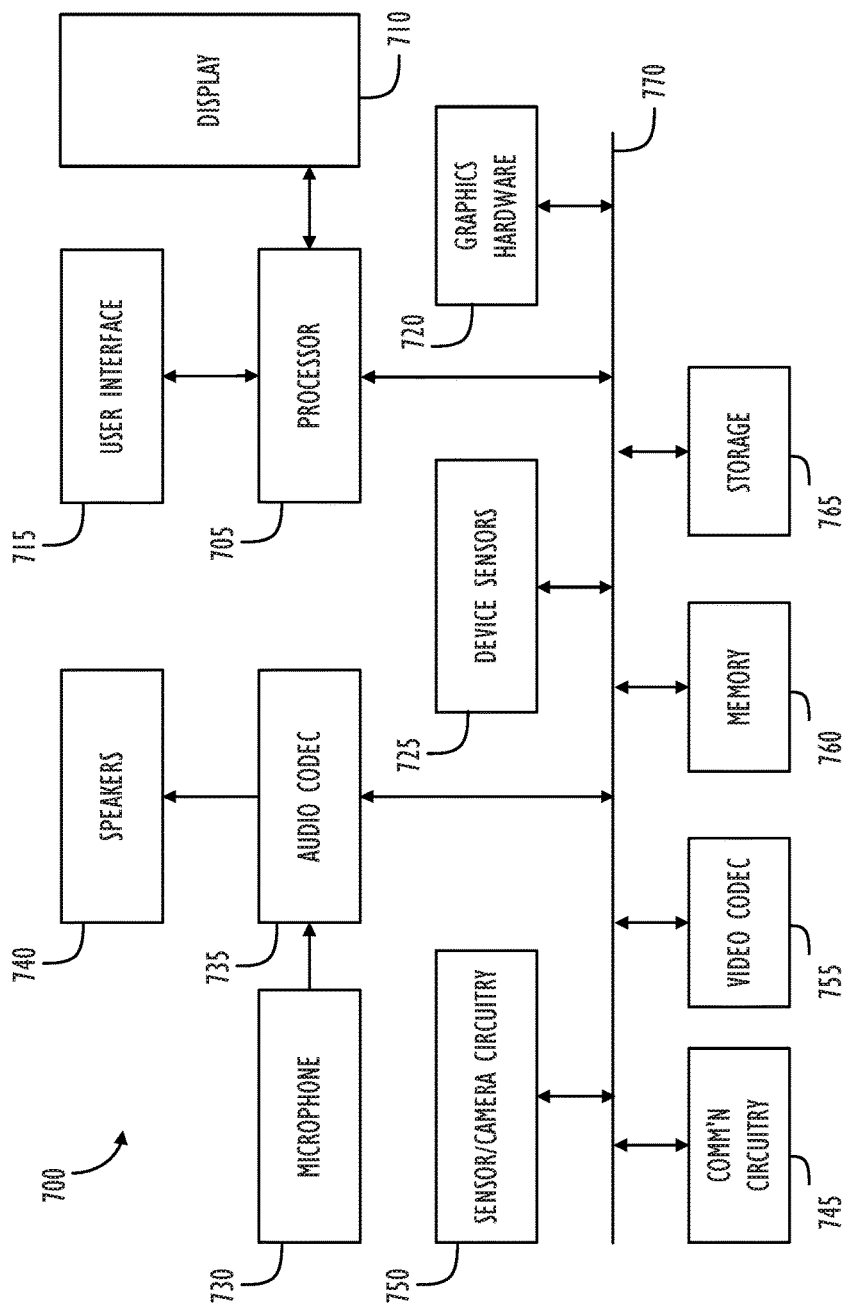
FIG. 7 illustrates, in block diagram form, a multi-function electronic image capture device, in accordance with one embodiment.

Referring to FIG. 7, a simplified functional block diagram of illustrative image capture electronic device 700 is shown according to one embodiment. Electronic image capture device 700 could be any device capable of recording or capturing 360° images (e.g., a device possessing two cameras that can capture simultaneous pairs of complimentary images with approximately 180° fields of view). Illustrative devices that could do this include, but are not limited to, a portable camera, a mobile telephone, personal media device, or a tablet computer system. As shown, electronic image capture device 700 may include processor 705, display 710, user interface 715, graphics hardware 720, device sensors 725 (e.g., proximity sensor/ambient light sensor, accelerometer and/or gyroscope), microphone 730, audio codec(s) 735, speaker(s) 740, communications circuitry 745, image capture circuit or unit 750, video codec(s) 755, memory 760, storage 765, and communications bus 770.

Processor 705 may execute instructions necessary to carry out or control the operation of many functions performed by device 700 (e.g., such as the generation stabilized 360° video sequences). Processor 705 may, for instance, drive display 710 and receive user input from user interface 715. User interface 715 can take a variety of forms, such as a button, keypad, dial, a click wheel, keyboard, display screen and/or a touch screen. User interface 715 could, for example, be the conduit through which a user may initiate and/or terminate acquisition of image sequences or video streams. Processor 705 may be a system-on-chip such as those found in mobile devices and include one or more dedicated graphics processing units (GPUs). Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 perform computational tasks. In one embodiment, graphics hardware 720 may include one or more programmable graphics processing units (GPUs). Image capture circuitry 750 may capture still and video images that may be processed to generate images and may, in accordance with this disclosure, include the ability to capture 360° images. Output from image capture circuitry 750 may be processed, at least in part, by video codec(s) 755 and/or processor 705 and/or graphics hardware 720, and/or a dedicated image processing unit incorporated within circuitry 750. Images so captured may be stored in memory 760 and/or storage 765. Memory 760 may include one or more different types of media used by processor 705, graphics hardware 720, and image capture circuitry 750 to perform device functions. For example, memory 760 may include memory cache, read-only memory (ROM), and/or random access memory (RAM). Storage 765 may store media (e.g., audio, image and video files), computer program instructions or software, preference information, device profile information, and any other suitable data. Storage 765 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 760 and storage 765 may be used to retain computer program instructions or code organized into one or more modules and written in any desired computer programming language. When executed by, for example, processor 705 such computer program code may implement one or more of the methods described herein.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). For example, FIG. 6 shows a flowchart illustrating 360° video stabilization and correction operation 600, in accordance with the disclosed embodiments. In one or more embodiments, one or more of the disclosed steps may be omitted, repeated, and/or performed in a different order than that described herein. Accordingly, the specific arrangement of steps or actions shown in FIG. 6 should not be construed as limiting the scope of the disclosed subject matter. The scope of the invention therefore should be determined with reference to the appended claims, along with the full scope of equivalents to which such claims are entitled.

The invention claimed is:

1. A method to stabilize a stream of spherical images, comprising:
   obtaining an input stream of spherical images from an image capture device, wherein each spherical image comprises corresponding metadata indicating a motion of the image capture device in one or more axial directions during capture of the respective spherical image;
   stabilizing the input stream of spherical images based on each spherical image's corresponding metadata; and
   storing the stream of stabilized spherical images in a memory,
   wherein stabilizing the input stream of spherical images comprises correcting a rotational motion in at least a first axial direction of at least one of the spherical images, and
   wherein the correction of the rotational motion in the at least a first axial direction of the at least one of the spherical images accounts for a translational motion of the image capture device.

2. The method of claim 1, wherein stabilizing the input stream of spherical images further comprises correcting a rotational motion in at least a second axial direction of at least one of the spherical images, wherein the correction of the rotational motion in the at least a second axial direction of the at least one of the spherical images does not account for a translational motion of the image capture device.

3. The method of claim 1, further comprising:
   analyzing the input stream of spherical images to identify one or more translational stabilization points,
   wherein the correction of the rotational motion in the at least a first axial direction of the at least one of the spherical images is further based, at least in part, on the one or more identified translational stabilization points.

4. The method of claim 3, wherein the identified one or more translational stabilization points comprise one or more of the following: a reference roll angle, a reference pitch angle, or a reference yaw angle.

5. The method of claim 3, wherein at least one of the identified one or more translational stabilization points comprises an object of interest.

6. The method of claim 1, wherein the at least a first axial direction comprises a yaw axis.

7. The method of claim 1, wherein the translational motion of the image capture device comprises a filtered motion path.

8. A non-transitory program storage device comprising instructions stored thereon to cause one or more processors to:
   obtain an input stream of spherical images from an image capture device, wherein each spherical image comprises corresponding metadata indicating a motion of the image capture device in one or more axial directions during capture of the respective spherical image;
   stabilize the input stream of spherical images based on each spherical image's corresponding metadata; and
   store the stream of stabilized spherical images in a memory,
   wherein stabilizing the input stream of spherical images comprises correcting a rotational motion in at least a first axial direction of at least one of the spherical images, and
   wherein the correction of the rotational motion in the at least a first axial direction of the at least one of the spherical images accounts for a translational motion of the image capture device.

9. The non-transitory program storage device of claim 8, wherein the instructions to stabilize the input stream of spherical images further comprise instructions to correct a rotational motion in at least a second axial direction of at least one of the spherical images, wherein the correction of the rotational motion in the at least a second axial direction of the at least one of the spherical images does not account for a translational motion of the image capture device.

10. The non-transitory program storage device of claim 8, further comprising instructions stored thereon to cause the one or more processors to:
    analyze the input stream of spherical images to identify one or more translational stabilization points,
    wherein the correction of the rotational motion in the at least a first axial direction of the at least one of the spherical images is further based, at least in part, on the one or more identified translational stabilization points.

11. The non-transitory program storage device of claim 10, wherein the identified one or more translational stabilization points comprise one or more of the following: a reference roll angle, a reference pitch angle, or a reference yaw angle.

12. The non-transitory program storage device of claim 10, wherein at least one of the identified one or more translational stabilization points comprises an object of interest.

13. The non-transitory program storage device of claim 8, wherein the at least a first axial direction comprises a yaw axis.

14. The non-transitory program storage device of claim 8, wherein the translational motion of the image capture device comprises a filtered motion path.

15. An electronic system, comprising:
    an image capture device;
    a display element;
    memory operatively coupled to the image capture device and the display element; and
    one or more processors operatively coupled to the image capture device, the display element, and the memory, the memory having stored therein instructions that, when executed by the one or more processors, cause the electronic system to:
    obtain an input stream of spherical images from the image capture device, wherein each spherical image comprises corresponding metadata indicating a motion of the image capture device in one or more axial directions during capture of the respective spherical image;

stabilize the input stream of spherical images based on each spherical image's corresponding metadata; and store the stream of stabilized spherical images in the memory, wherein the instructions that, when executed by the one or more processors, cause the electronic system to stabilize the input stream of spherical images further comprise instructions that, when executed by the one or more processors, cause the electronic system to correct a rotational motion in at least a first axial direction of at least one of the spherical images, and wherein the correction of the rotational motion in the at least a first axial direction of the at least one of the spherical images accounts for a translational motion of the image capture device.

16. The electronic system of claim 15, wherein the instructions that, when executed by the one or more processors, cause the electronic system to stabilize the input stream of spherical images further comprise instructions that, when executed by the one or more processors, cause the electronic system to correct a rotational motion in at least a second axial direction of at least one of the spherical images, wherein the correction of the rotational motion in the at least a second axial direction of the at least one of the spherical images does not account for a translational motion of the image capture device.

17. The electronic system of claim 15, further comprising instructions stored in the memory that, when executed by the onr ore more processors, cause the electronic system to:

analyze the input stream of spherical images to identify one or more translational stabilization points, wherein the correction of the rotational motion in the at least a first axial direction of the at least one of the spherical images is further based, at least in part, on the one or more identified translational stabilization points.

18. The electronic system of claim 17, wherein the identified one or more translational stabilization points comprise one or more of the following: a reference roll angle, a reference pitch angle, or a reference yaw angle.

19. The electronic system of claim 17, wherein at least one of the identified one or more translational stabilization points comprises an object of interest.

20. The electronic system of claim 15, wherein the translational motion of the image capture device comprises a filtered motion path.

* * * * *

UNITED STATES PATENT AND TRADEMARK OFFICE
CERTIFICATE OF CORRECTION

PATENT NO. : 10,097,759 B1
APPLICATION NO. : 15/282821
DATED : October 9, 2018
INVENTOR(S) : Ricardo Motta et al.

Page 1 of 1

It is certified that error appears in the above-identified patent and that said Letters Patent is hereby corrected as shown below:

In the Claims

Claim number 17, at Column 18, Line number 8, "onr ore more processors, cause the electronic system to:" should be changed to -- one or more processors, cause the electronic system to: --

Signed and Sealed this
Thirteenth Day of November, 2018

Andrei Iancu
*Director of the United States Patent and Trademark Office*